United States Patent [19]

van Hattem et al.

[11] Patent Number: 5,083,503
[45] Date of Patent: Jan. 28, 1992

[54] METHOD AND AN APPARATUS FOR MAKING A BEVERAGE SUCH AS COFFEE, SOUP, TEA, COCOA OR THE LIKE

[75] Inventors: Jan C. van Hattem, Amerongen; Bernardus M. van Thoor, Maarssen; Jan Sperna Weiland, Deventer, all of Netherlands

[73] Assignee: Sara Lee/DE N.V., Utrecht, Netherlands

[21] Appl. No.: 435,961

[22] Filed: Nov. 14, 1989

[30] Foreign Application Priority Data

Nov. 14, 1988 [NL] Netherlands ............ 8802789

[51] Int. Cl.⁵ .............................................. A47J 31/34
[52] U.S. Cl. ................................ 99/289 D; 99/302 R
[58] Field of Search ............. 99/289 R, 289 D, 289 P, 99/279, 291, 297, 300, 302 R, 302 P; 426/435

[56] References Cited

U.S. PATENT DOCUMENTS 2,943,556 7/1960 Egi .................................. 99/289 D
4,034,660 7/1977 Egi .................................. 99/289 R

Primary Examiner—Robert W. Jenkins
Attorney, Agent, or Firm—Cushman, Darby & Cushman

[57] ABSTRACT

A method and an apparatus for making beverages, such as coffee, soup, tea, or the like, wherein a starting product, such as ground coffee, is supplied to a cavity and is enclosed therein by a piston. After this, through an opening provided in the piston, a quantity of fluid, in this case water, originating from a water system is pressed into said cavity. Hereafter, the fluid, after extraction of the starting product contained in the chamber, in this case filling chamber, is discharged through an opening near the end opposite the piston, the control of this process taking place electronically. The method is characterized in that use is made of an apparatus having at least two filling chambers of different size and mounted on a movable holder and that the various steps are performed during a single cycle of the holder.

20 Claims, 10 Drawing Sheets

METHOD AND AN APPARATUS FOR MAKING A BEVERAGE SUCH AS COFFEE, SOUP, TEA, COCOA OR THE LIKE

BACKGROUND OF THE INVENTION

This invention relates to a method of making beverages, such as coffee, soup, tea or the like, wherein a starting product, to be referred to hereinafter only as coffee, is supplied to a cavity, is enclosed therein by a piston, after which through an opening provided in the piston, a quantity of fluid, in this case water, originating from a water system, is pressed into the cavity after which the fluid, after extraction of the starting product contained in the chamber, in this case filling chamber, is discharged through an opening near the end opposite the piston, the process being controlled electronically.

In such a method disclosed in German patent 3,607,656, use is made for moving the piston in a cylindrical hollow space, of an electric motor having a control member and a pressure gauge, while on the other hand a stepper motor is provided for controlling the control member. This known apparatus is suitable for a limited number of possibilities, since the apparatus only has a single cylindrical filling chamber wherein the piston, through which also the water is supplied, can be moved more or less far in the chamber.

However, a cup of coffee of good quality made within a given period of time and which uses the coffee effectively, requires a certain bed geometry.

SUMMARY OF THE INVENTION

It is an object of the present invention to provide an apparatus offering various possibilities for an optimum preparation of a beverage. The requirements to be imposed upon the apparatus are summarized as follows.

1. The successive preparation of a number of cups of beverage should take place within maximally 20 seconds per cup of beverage;
2. The preparation of a pot of beverage of about 1 liter should take place within 1 minute;
3. Various types of beverage should be processible without change of the apparatus, i.e. not only different blends, but, in the event of e.g. coffee, also compacted types, decaffeinated types and "espresso";
4. The production cost per unit should be low;
5. The reliability in operation should be high;
6. The machine should be modular and compact; and
7. The machine should at least provide such a brewing and extraction efficiency that a good quality of the brew is ensured.

To that end, there is disclosed therein a method of preparing beverages, such as coffee, soup, tea or the like, using an apparatus having at least two filling chambers of different diameters and disposed on a movable holder, while the various steps for each filling chamber are performed during a single cycle of the holder.

The present invention further relates to an apparatus for performing this method, comprising a housing a part of which at least is mounted for rotation around a shaft and which part contains at least two chambers arranged to receive the starting product, which chambers are connected or connectable through a tubular connection to a fluid supply duct, while on the side of said connection, the filling chamber contains a fluid distributor plate, and on the side of the housing opposite the fluid supply duct, there is provided a cover for each chamber.

In one embodiment, use can be made of a housing with a horizontal central shaft through which a fluid passage extends wherein the passage of the tubular connection terminates, which housing is partly enclosed by a cap containing a guide groove for operating the cover movement, and the filling of the filling chamber with a starting product can take place in the highest position of the respective filling chamber, and the starting product can then be enclosed by the outward movement of the distributor plate being under the control of a cam roller, while the brewing can take place in the next position of the central shaft, after which ejection of the finished starting product can be effected in a next position.

The exterior of the cover may be controlled by a guide groove provided in the cap disposed exteriorly of the housing and partly roofing the same.

The cover may alternatively be connected rotatably through two connecting plates to a connecting piece guided through said guide groove by means of a follower roller. The second of said connecting plates may be triangular and coact in the end position with a guide groove and impinge on a stop in such a manner that the connecting plate can perform a tilting movement and hence the cover a linear movement.

According to another embodiment of the present invention, use can be made of an intermediate piece and cover with a vertical central shaft and accommodated in the stationary housing, there being provided a drive motor whose movement ensures the peripheral positioning of the stationary and the movable part, and a drive motor for positioning the movable parts relatively to each other, and the filling of the filling chamber with the starting product taking place in a first position, the supply and discharge of liquid in a second position and the removal of the starting product used in a third position, after which the parts, upon further movement, return to their starting position.

In a further elaboration of the present invention, an upper part of the apparatus last mentioned may be attached to a support plate and a lower part be affixed to the upper part, said parts together forming a housing through which extends a central shaft adapted to coact by means of a screw connection with a boss supporting the cover and the intermediate piece and adapted to move vertically for closing the cylindrical chambers in the intermediate piece and to vertically move the cover and the intermediate piece for pressing it against the upper part.

There may be provided a drive motor for driving the boss for bringing the cover and/or the intermediate piece in the correct rotary position.

In still another embodiment of the present invention, use can be made of a construction wherein, similarly to the embodiment described above, the apparatus comprises an upper part or block fixedly connected to the housing, an intermediate piece, and a cover, and wherein the various parts are driven not through a central shaft, as described above, but through the exterior of these parts. To that end, a block constructed as upper part can be attached to a housing, the block being provided outwardly with a cylinder rotatably connected thereto, said cylinder having external teeth and being internally threaded and adapted to coact with a corresponding thread of a cylinder inwardly of which there are provided a plurality of filling chambers arranged uniformly with respect to the central axis, said chambers being shut off at the bottoms by a cover having a beverage outlet.

Because use is made in the construction according to the present invention of at least two chambers of different diameters and different adjustable depths, or heights, as well as an adjustability of a liquid distributor plate or the lowest part of the housing, different blends and different types of starting product can thus be processed optimally.

BRIEF DESCRIPTION OF THE DRAWINGS

Some embodiments of the apparatus according to the present invention will now be described, by way of example, with reference to the accompanying drawings, in which:

FIGS. 9A-9M are diagrammatic views of the operation of the apparatus shown in FIGS. 5, 6, and 7, 8, respectively.

DETAILED DESCRIPTION

Figure 1:
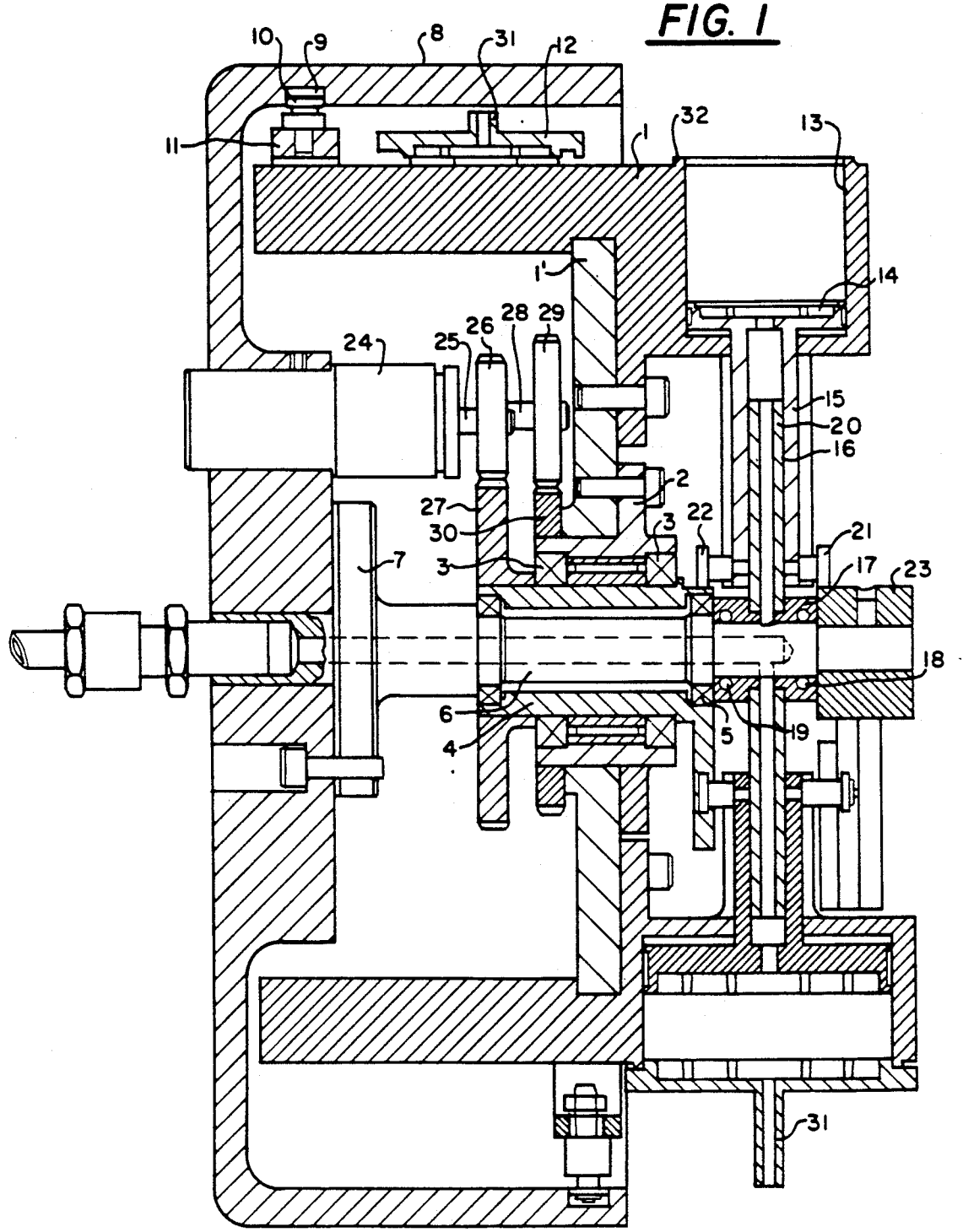
FIG. 1 is a diagrammatic cross-sectional view of the apparatus on the line I—I of FIG. 2.
Figure 2:
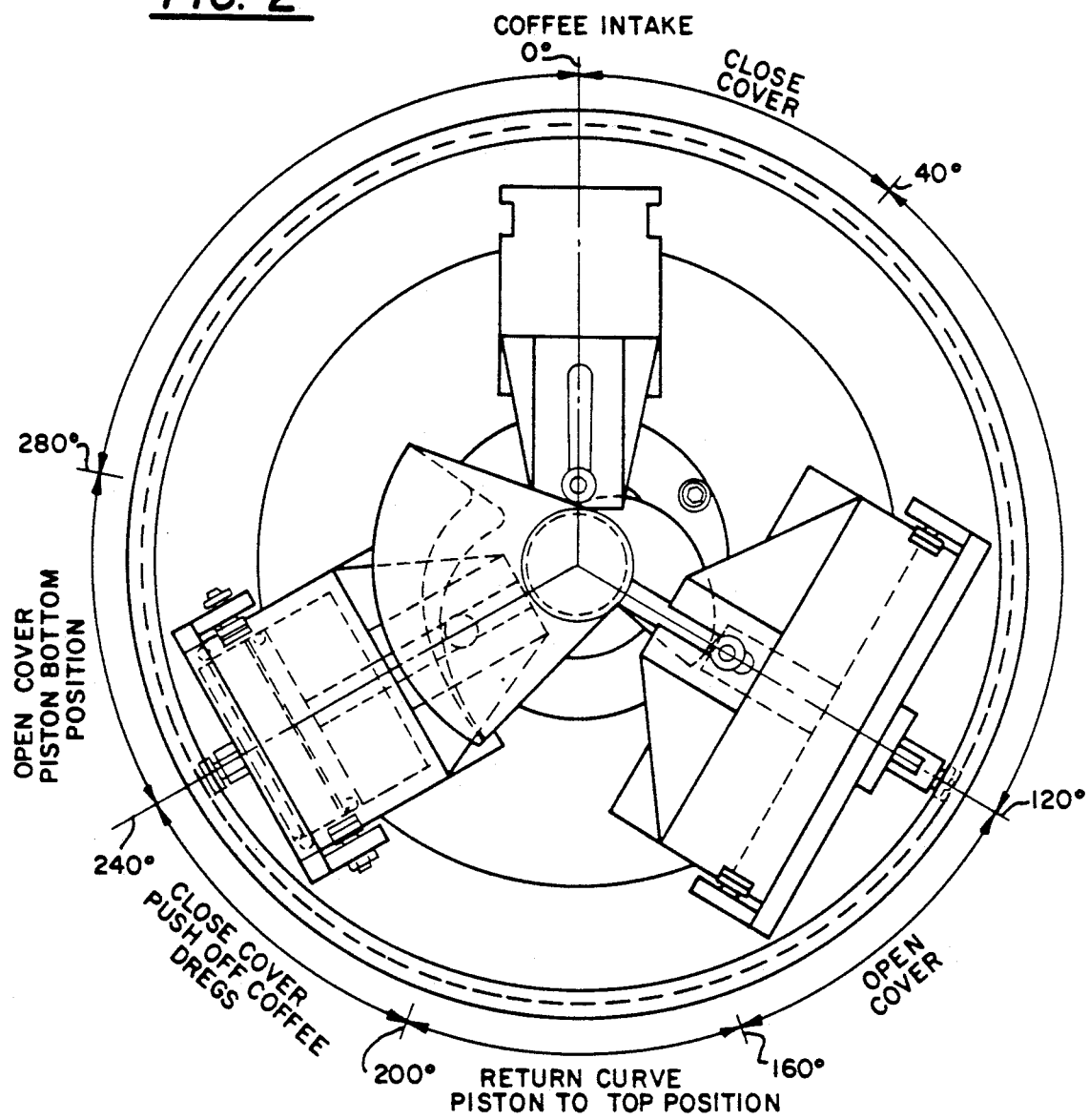
FIG. 2 is a diagrammatic right-hand side view of the apparatus of FIG. 1.

As shown in FIGS. 1 and 2, an apparatus comprises a housing 1, which is connected rotatably to a hollow shaft 6 through a connecting plate 1', a bearing housing 2, bearings 3, bearing bush 4 and subsequently bearings 5. Hollow shaft 6 is further provided with a boss 7 serving for mounting a cap 8 on the shaft. Cap 8 is provided internally with a curved guide groove 9 (see FIG. 3) incorporating a follower roller 10 forming part of a connecting piece 11 affixed to a cover 12. Cover 12 serves for closing an opening or brewing chamber 13 disposed within housing 1 and having a cylindrical, elliptical or other construction. In the bottom of said chamber, there is provided a liquid distributor plate 14 affixed to a supply tube 15 movable axially with respect to the brewing chamber 13. To that end, supply tube 15 contains a cavity connected slidingly to a tube 16 whose opposite end is affixed to a bush 17 (see FIG. 4) provided on shaft 6, supply tube 15 and tube 16 having passages, thereby producing an open communication between the interior of the tube 6 and the bottom of the brewing chamber. To seal off the assembly, bush 17 is fitted with two sealing rings 18, 19, while bush 16 has a sealing ring 20. Supply tube 15, near its end facing shaft 6, has two rollers 21, 22 adapted for coaction with the outer surface of an end bush 23 mounted on shaft 6 or an outer surface of bearing bush 4. As shown in the drawings, in particular FIGS. 1 and 2, the liquid distributor plates, under the influence of rollers 21, 22, always occupy different positions.

For the purpose of the vertical adjustment of the liquid distributor plate 14, cap 8 is provided with a motor 24 a projecting shaft 25 of which has a gear wheel 26 adapted for coaction with a gear wheel 27 fixedly mounted on bearing bush 4. For rotating the assembly, the cap incorporates a motor, not shown, driving a shaft 28 having a gear wheel 29 coacting, in its turn, with a gear wheel 30 fixedly mounted on bearing bush 2. In this manner, housing 1 can be rotated with brewing chambers 13, while also the position of the cover relative to the associated brewing chamber can be controlled automatically by means of guide groove 9. Also the position of the liquid distributor plate is controlled by rotation of housing 1, depending upon the form of the outer surface of bearing bush 4, or end bush 23 at the location where these are in contact with rollers 21, 22. In this manner, upon rotation of the housing, a cycle can be obtained in a simple manner. It is observed, moreover, that cover 12 of brewing chamber 13 is provided with an outlet opening 31.

As shown in the drawings, especially FIG. 2, the apparatus has three different brewing chambers 13, each of different size and which may also have an adjustable height through rollers 21, 22, so that the possibilities for making a more or less strong cup of coffee, or the number of cups of coffee to be made can be changed. The latter can be influenced because the liquid distributor plate 14—as viewed in axial direction of the brewing chambers—is displaceable therein.

Figure 3:
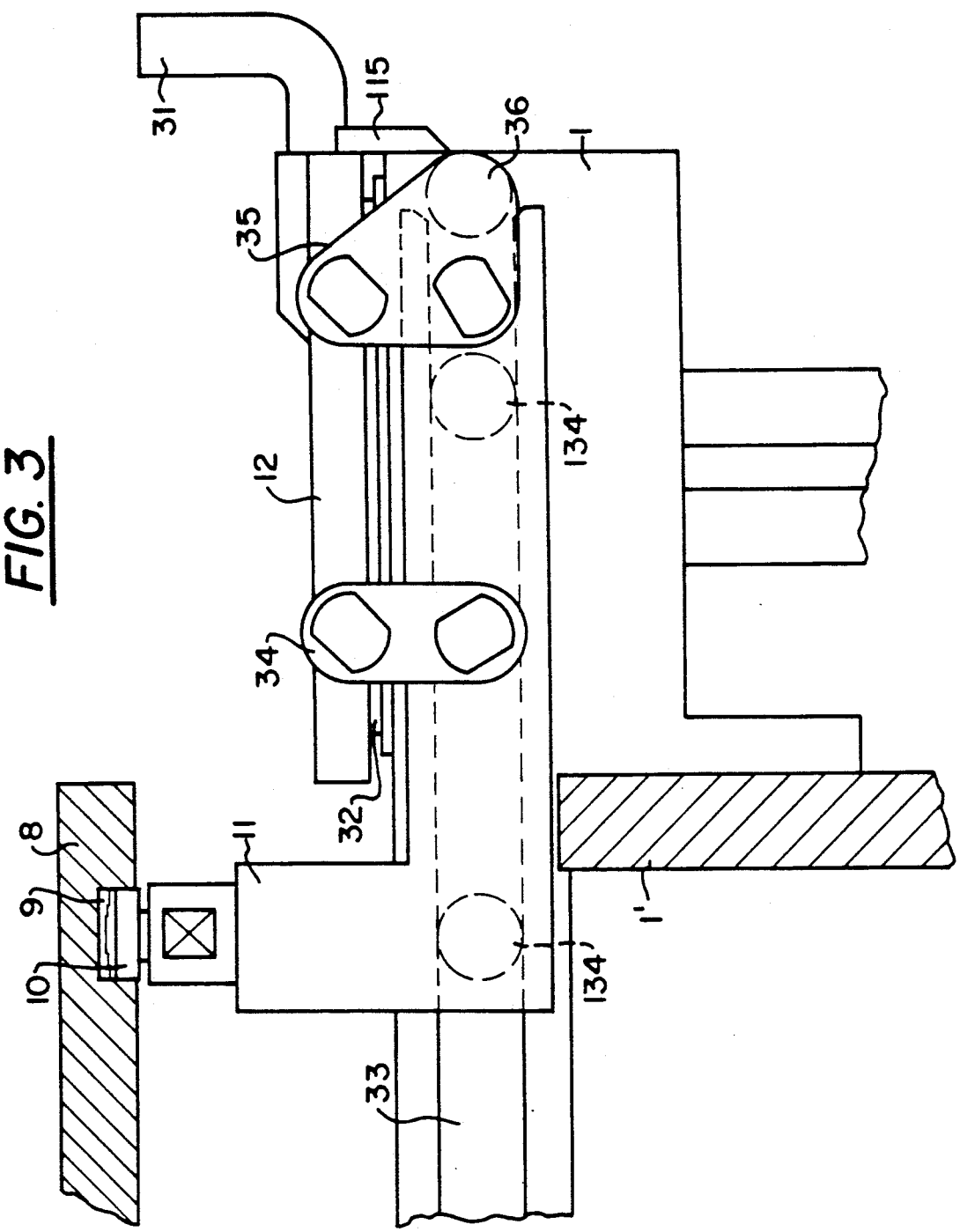
FIG. 3 shows a detail of the cover closure used in the apparatus according to FIGS. 1 and 2.

It is moreover observed that, as appears from the construction shown in FIG. 3, cover 12, upon closure of brewing chamber 13, is moved not only to above the upright edge 32 of the brewing chamber, but is also pressed downwards by said edge 32. This appears especially from the construction shown in FIGS. 1-3, showing successively cap 8, guide grooves 9, follower roller 10 and connecting piece 11. Said connecting piece cooperates with housing 1, for which purpose housing 1 is provided with a groove 33 adapted for coaction with rollers 134 mounted for rotation on connecting piece 11. Cover 12 is fitted with two connecting plates 34, 35, whose other ends are connected for rotation with the cover.

As shown in FIG. 3, connecting plate 35 is triangular and arranged in such a manner that, upon abutment of the rightmost roller 36 from groove 33 against a stop 115, connecting plate 35 will tilt for a small distance, i.e. cover 12 is thereby pushed firmly over the edge 32 of the brewing chamber.

Figure 4:
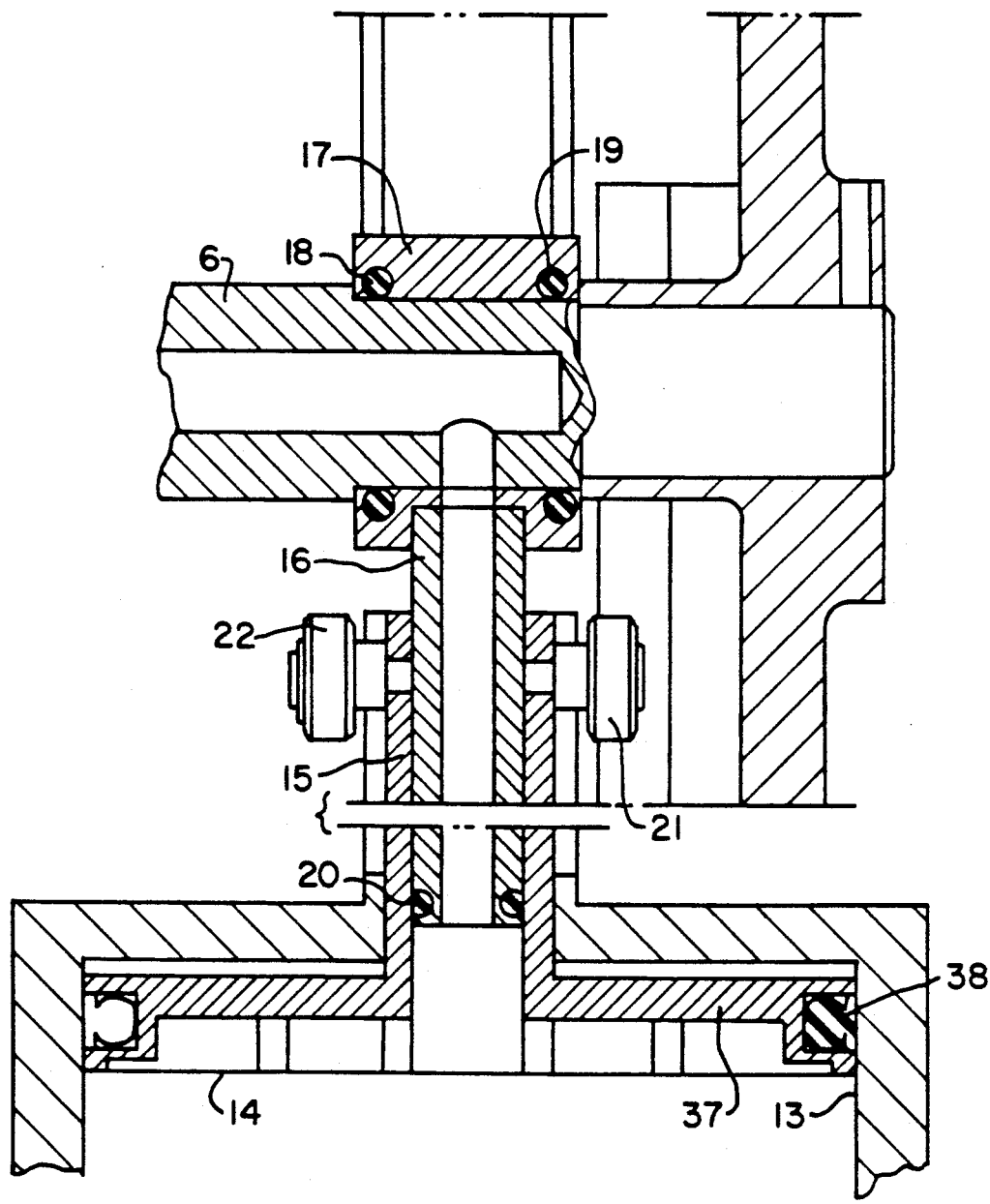
FIG. 4 shows a detail of the water supply used in the apparatus of FIGS. 1-3.

FIG. 4 shows an enlarged detail of the construction of FIG. 1 more in particular of the manner in which the water connection from main supply tube 6 to brewing chamber 13 takes place.

As shown in FIG. 4, supply tube 15 in brewing chamber 13 is enlarged, so that the water supplied therethrough can flow away on all sides and subsequently can be dispersed by distributor plate 14 over the entire lower surface thereof through the material present in the brewing chamber. In order to obtain a proper sealing, the upright edges of the enlarged portion 37 contain a sealing ring 38.

Figure 5:
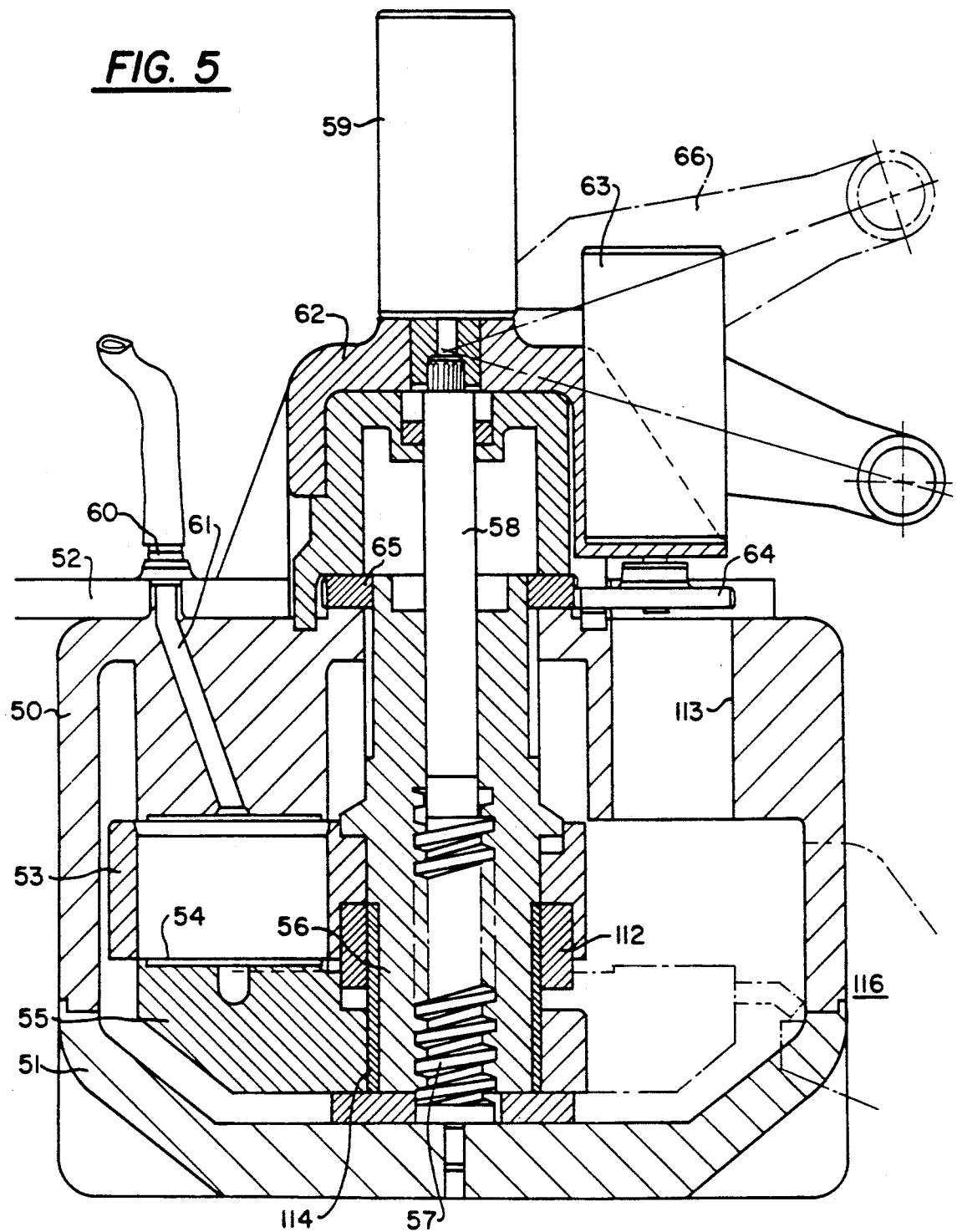
FIG. 5 is a diagrammatic, partly cross-sectional side view of another embodiment of the apparatus according to the invention.
Figure 6:
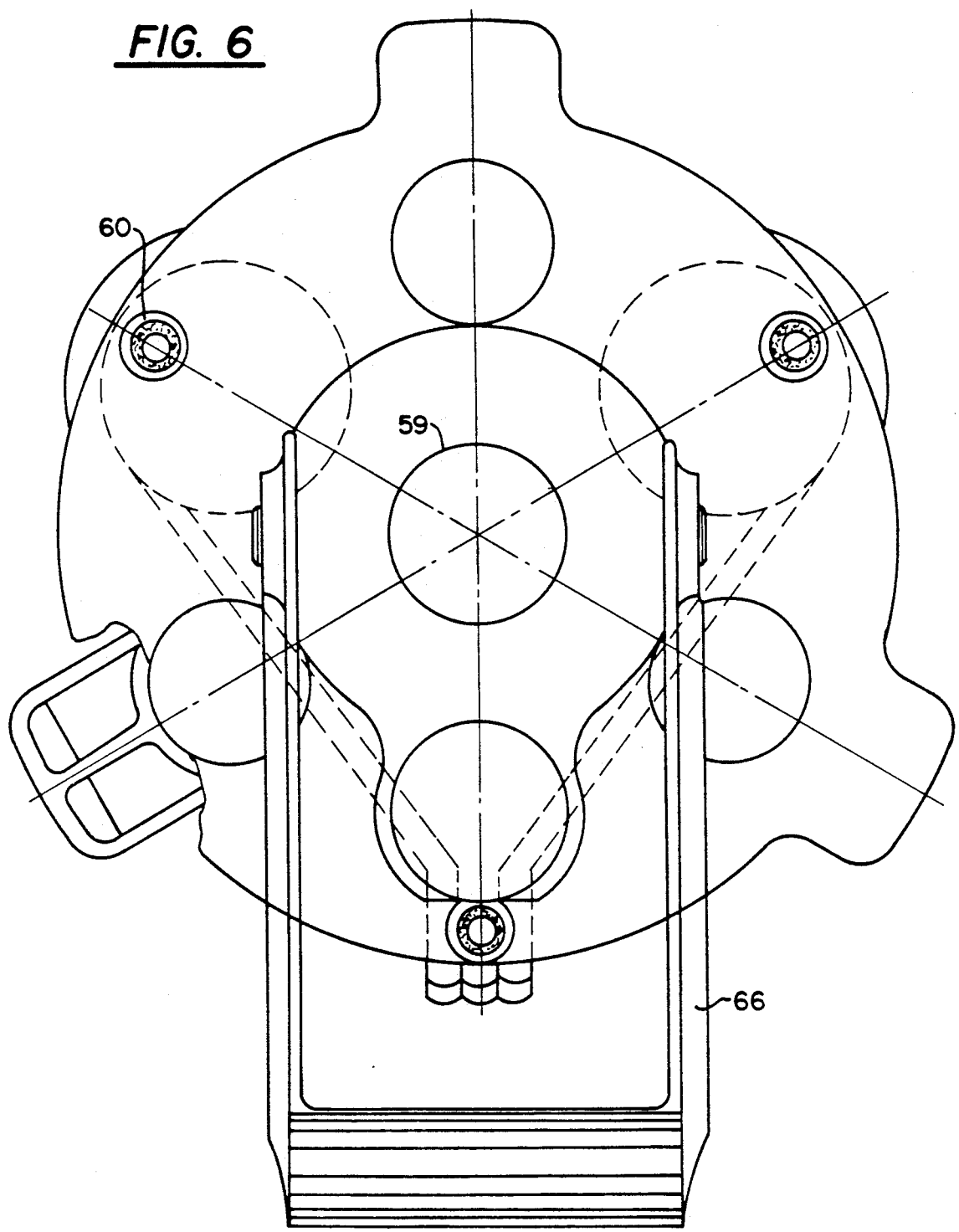
FIG. 6 is a top view of the apparatus of FIG. 5.

In the embodiment of the apparatus according to the present invention shown in FIGS. 5, 6, the housing essentially includes an upper portion 50 and a lower portion 51 fixedly interconnected. The assembly is clampingly mounted on a support plate 52 through handgrip 66. Provided between upper and lower portion are a plurality of cylindrical chambers 53 whose undersides are shut off by a perforated sheet 54 supported by a cover 55. Cover 55 is connected for axial sliding movement to a boss 56 movable by means of a thread transmission 57 mounted on a central shaft 58 driven by a motor 59, thereby also effecting the movement of cover 55 and chambers 53 relative to upper portion 50.

Provided on support plate 52 is a water connection 60, while upper portion 50 contains a fluid passage 61.

As further shown in FIG. 5, motor 59 is mounted on a cap 62 on which there is also mounted a motor 63 whose output shaft is fitted with a toothed wheel 64 coacting with a toothed wheel 65 mounted on boss 56, thus enabling a rotary and axial adjustment of the cylinder with chambers 53 and cover 55.

Figure 7:
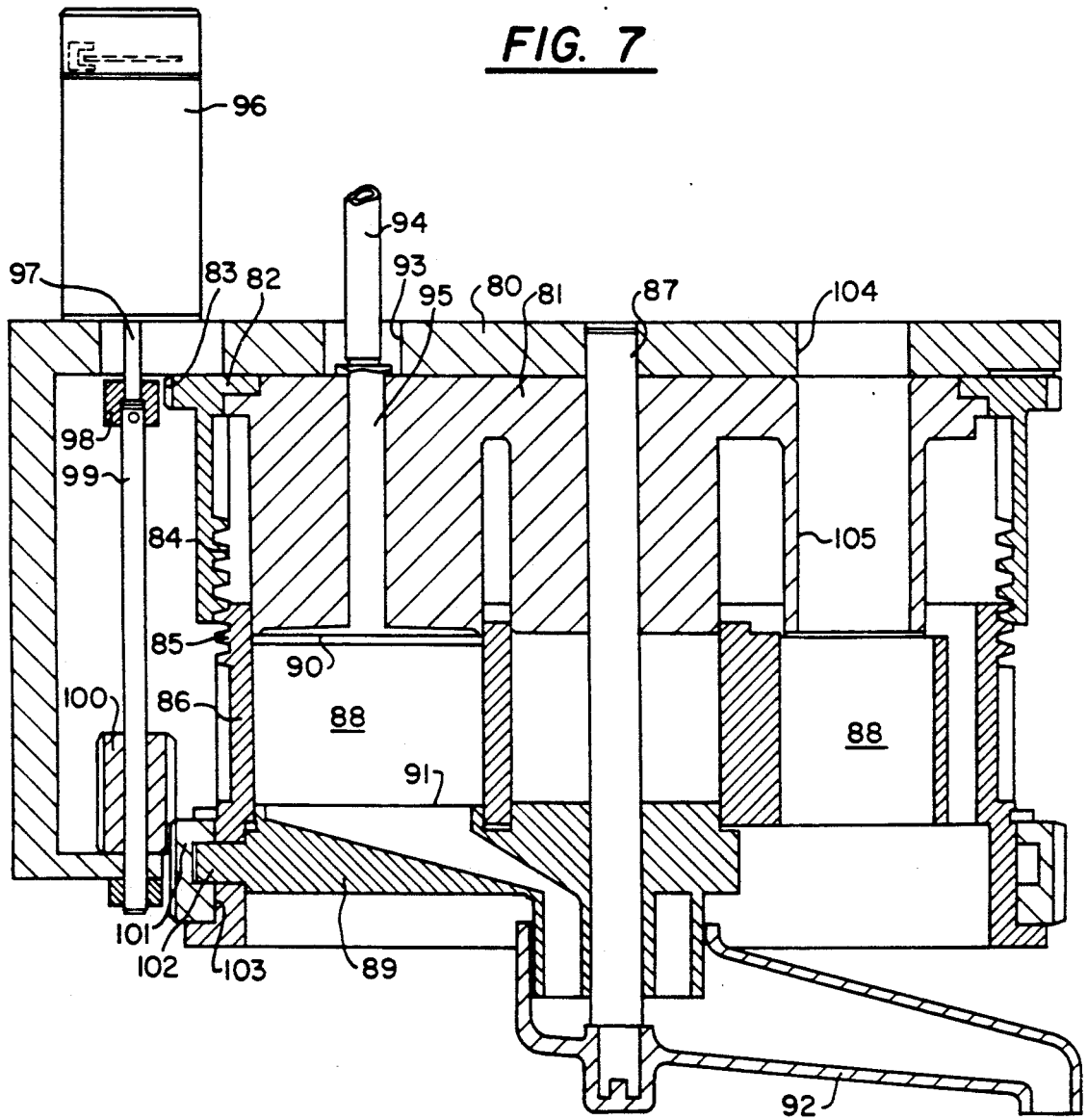
FIG. 7 is a diagrammatic cross-sectional view on the line VII—VII of FIG. 8 of a third embodiment of the apparatus according to the invention.
Figure 8:
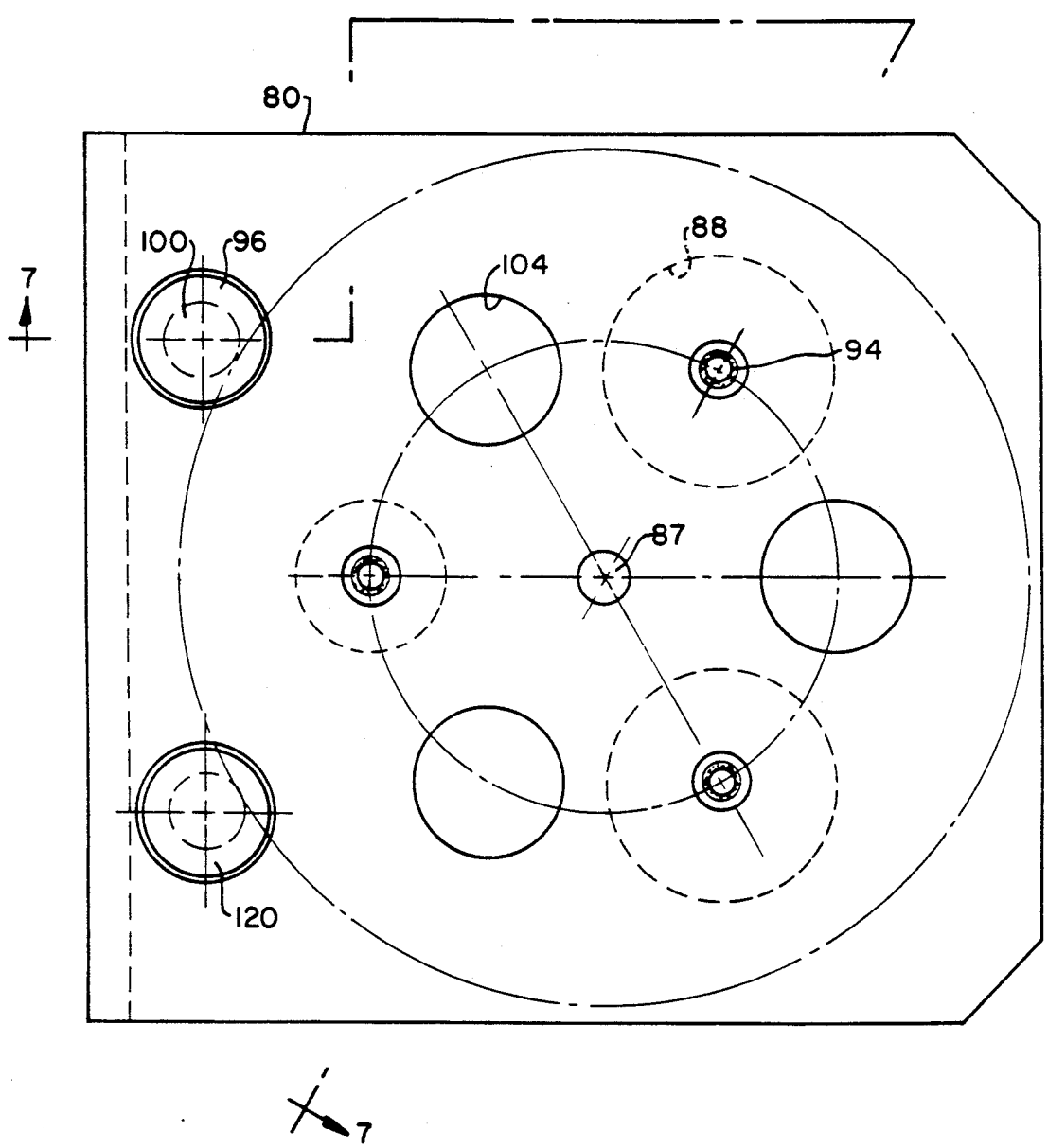
FIG. 8 is a top view of the apparatus of FIG. 7.

The apparatus shown in FIGS. 7 and 8 is highly similar to that shown in FIGS. 5 and 6. The difference essentially consists in the feature that the worm connection provided in the construction shown in FIGS. 5, 6 between central shaft 58 and boss 56 has been displaced outwards, thereby obtaining a substantially more stable apparatus.

The construction of FIGS. 7, 8 shows in greater detail a housing 80 accommodating a block 81 affixed to housing 80. Outwardly of block 81 there is provided a cylinder 82 connected rotatably to the housing, said cylinder being provided exteriorly with teeth 83 and inwardly with a screw thread 84. Screw thread 84 is adapted for coaction with screw thread 85 of a cylinder 86. Provided inwardly of cylinder 86 are a plurality of preparing, brewing or filling chambers 88 arranged uniformly around a central shaft 87 of block 81. The undersides of chambers 88 are shut off by a "cover" 89 constructed in such a manner that on the one hand beverage draining can take place and on the other hand discharge of the finished starting product can take place. As further shown in the drawings, the top of filling chamber 88, after filling, is closed by a distributor plate 90 and the underside is shut off by a perforated plate 91. Cover 89 is maintained in position by a downwardly extended portion of "cylinder" 86. Provided around the concentrate drain is a drain spout 92 connected slidingly thereto and affixed to central shaft 87.

As also shown in the drawings, the cover is provided with an opening 93 for the passage of a water supply passage 94 communicating with a passage 95 provided in block 81 of preparing, brewing and filling chamber 88.

Furthermore, mounted on housing 80 is a motor 96 whose output shaft 97 is connected through a connecting piece 98 to a shaft 99 on whose lower end there is provided a pinion 100. Pinion 100 is adapted to cooperate with a toothed wheel 101 connected to cylinder 86. By energizing motor 96, toothed wheel 101 imparts a rotating or a lifting motion to cam 102 or cover 89, so that the starting product present in the brewing of filling chamber 88 can be enclosed therein or removed therefrom.

The right-hand half of FIG. 7 shows the filling position, in which through openings 104, 105, ground coffee or the like can be supplied from a funnel, not shown, to brewing chamber 88.

For the sake of clearness, FIGS. 9A–9M diagrammatically show the operation of the apparatus of FIGS. 5–6, and 7–8, respectively. The apparatus essentially comprises a lower perforated plate, in this case a cover FIG. 9A, an intermediate piece FIG. 9B with cylinders and an upper portion C with filling holes or pistons. These parts cooperate in the manner shown in FIG. 9D. Under it are shown in FIGS. 9E–9M the various positions of the parts during a movement cycle. In the starting position FIG. 9E, the perforated plate and the intermediate piece are interconnected. In the next position FIG. 9F, the cylinders are filled via the intermediate piece, after which an enclosure (position shown in FIG. 9G) of the starting product in the cylinders takes place by moving the intermediate piece (with the cylinders) and the perforated plate towards the upper portion, after which a supply and discharge of medium takes place; FIG. 9H.

Figure 9A:
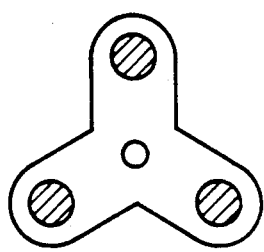
Figure 9B:
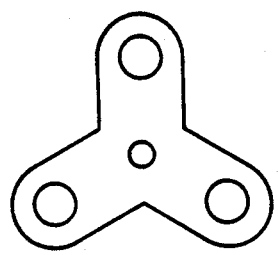
Figure 9C:
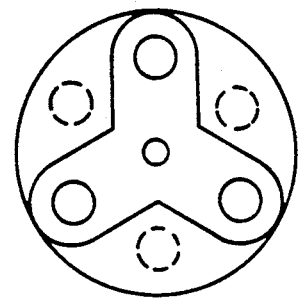
Figure 9D:
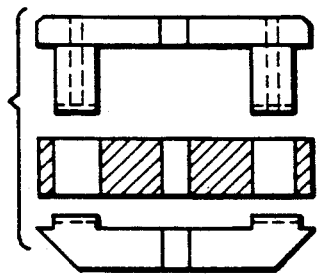
Figure 9E:
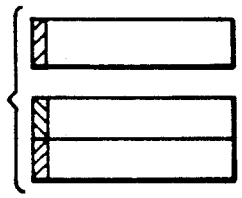
Figure 9F:
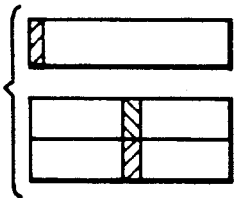
Figure 9G:
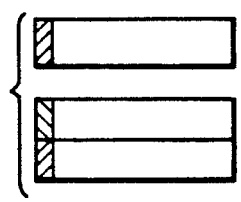
Figure 9H:
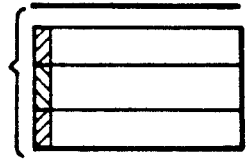
Figure 9K:
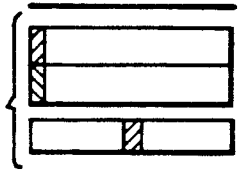
Figure 9L:
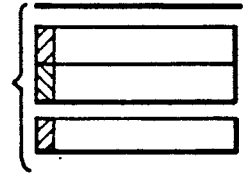
Figure 9M:
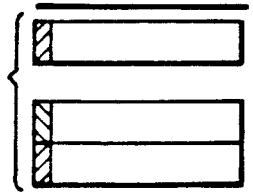

In a subsequent phase, FIG. 9K, the cover of FIG. 9A with the perforated plates is moved downwards, after which the ground coffee used is pushed away. In a later phase, FIG. 9M, the intermediate piece is again moved downwards and connected to the perforated plate, thereby reaching the starting position of FIG. 9E.

In the construction according to FIGS. 5–9M, similarly to the above described manner, use is made according to FIGS. 1–4 of three filling chambers of different diameters and different heights, thereby obtaining a quantity of coffee of desired quality in an easy and automatic manner.

For relative axial movement of upper portion 81 (see FIG. 7), cylinder 86 with filling chambers 88 and cover 89 serves motor 120 (see FIG. 8), which is connected via toothed wheels (inter alia 83, FIG. 7) to cylinder 82, after which, due to the movement of screw threads 84, 85 relative to one another, cylinder 86 and cover 89 can be moved vertically.

Figure 10:
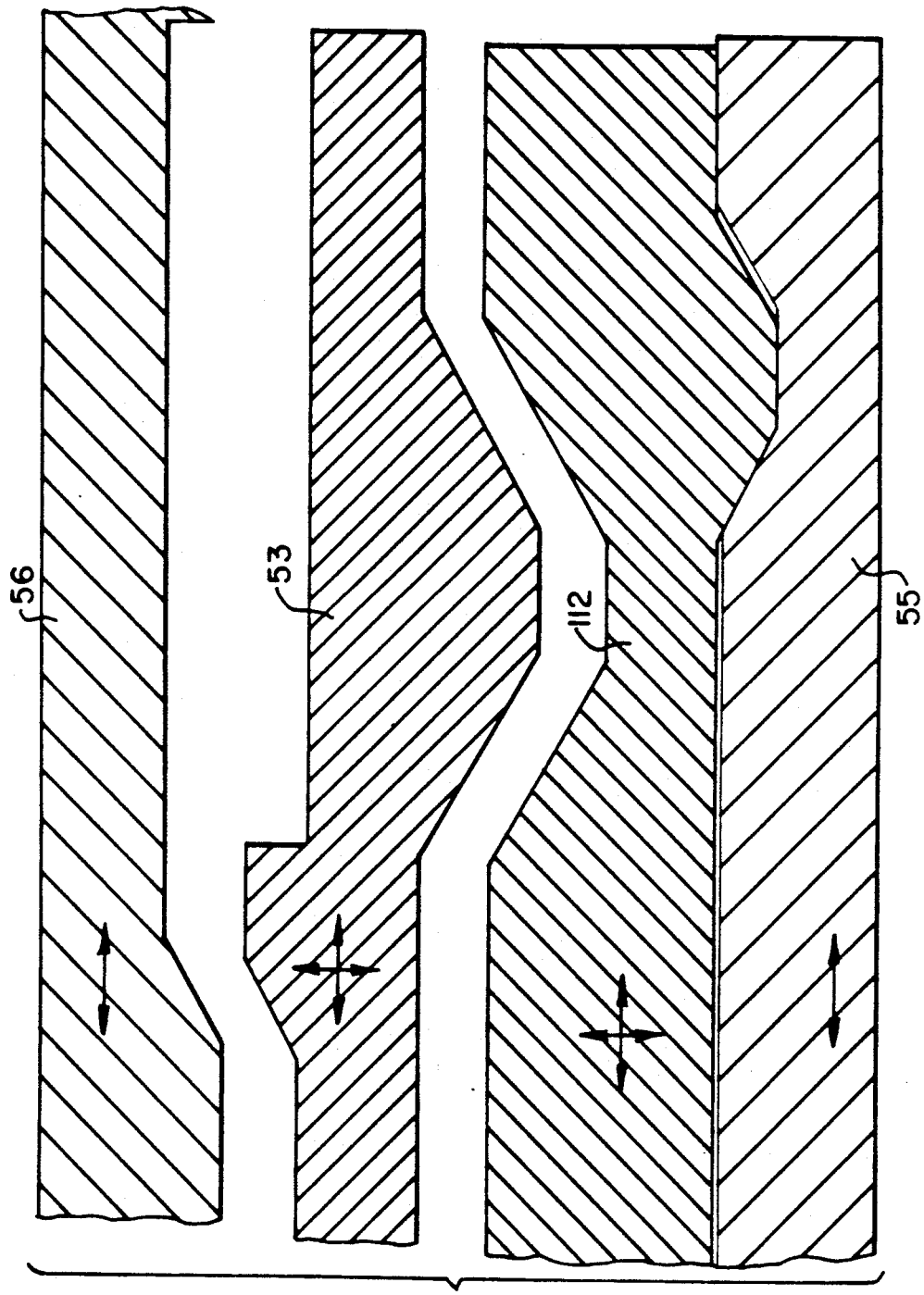
FIG. 10 is a diagrammatic cross-sectional view of a part of the drive unit of the apparatus shown in FIGS. 5 and 6.

Similarly, also in the construction of FIG. 5, parts 56, 53 and 55 can cooperate. To that end, use may be made of a construction as shown in FIG. 10, showing diagrammatically parts, from the top downwards, of boss 56, intermediate piece 53, an intermediate ring 112 and a part, in the present case, a cover 55. As shown in the drawings, parts 50, 53, 112 and 55 are provided at the facing sides with cut-outs and cams, so that, upon relative rotation of these parts, they can be removed or approached. As shown in FIG. 5, intermediate piece 53, intermediate ring 112 and cover 55—as viewed vertically—are interconnected by a key 114, so that they can always execute a relative vertical movement. The drawings show with arrows the possible movements of the hub, the intermediate piece, the intermediate ring and the part or cover.

The apparatus is operated as follows:

Immediately after extraction of the coffee, it should be ejected. To that effect, cylinder 53 is lifted for about 5 mm by intermediate ring 112. Cover 55 is thereby released from cylinder 53 and upper portion 50. Likewise intermediate ring 53 sags into cover 55. Intermediate ring 112 is mounted for axial sliding movement on hub 56 through a keyed connection and is swivelled together with cover 55 for about 60° by means of motor 63 (rotation movement).

Cylinder 53 and cover 55 are lifted by means of the thread transmission 57 and the coffee used is ejected. The direction of rotation of motor 63 is reversed, so that a backward rotation of about 60° takes place. The top of lower cover 55 and the bottom of cylinder 53 thereby wipe one another clean. Subsequently, hub 56 and intermediate ring 112 rotate simultaneously due to the keyed connection, with a stop of the hub abutting against a stop of cylinder 53, which corresponds to about 75°. Cylinder 53, being mounted for free rotation and for free axial movement around hub 56, is blocked at this moment, because it is still around upper portion 50; consequently, also the stop of the cylinder is fixed.

After cleaning, hub 56 and intermediate ring 112 in the construction shown in FIG. 10 move to the right, so that cover 55 stands against a stop and thereby directly underneath cylinder 53. Hub 56 and (hence) intermediate ring 112 are rotated further for about 15°, so that cylinder 53 is pressed downwards by hub 56 for about 5 mm around filter 54 (and 55) by means of run-on lugs. Simultaneously, intermediate ring 112 is pressed upwards by lower piston 55 for about 5 mm.

Through motor 59 and thread transmission 57, cylinder 53 and intermediate ring 112, as well as cover 55 are rotated downwards, clear of piston 50. Cylinder 53, intermediate ring 112 and cover 55 have thus become freely rotatable. By means of motor 63, hub 56, intermediate ring 112, cylinder 53 and cover 55 are now moved to feed funnel 113 and cylinder 53 is filled. After this, motor 63 reverses the rotation of the assembly until the cylinder with chambers 53 is again exactly underneath piston 50. Motor 59 now drives thread transmission 57, thereby lifting the assembly, so that the coffee is enclosed with respect to upper portion 50. Extraction water is now supplied via fluid passage 61, while the resulting beverage exits the apparatus through perforated plate 54 and an outlet opening 116.

After this, the cylinder with chambers 53 has to come clear again of cover 55 for the purpose of ejecting the coffee used. To that end, hub 56 and intermediate ring 112 are turned back for about 15° by motor 65. Intermediate ring 112 then lifts cylinder 53 with the chambers for about 5 mm. Subsequently, intermediate ring 112 sags for about 5 mm into cover 55, so that this has become "rotatable" and can turn away, so that a "hole position" of cover 55 comes underneath chambers 53 and the coffee used can be ejected, after which the cycle can be repeated.

Characteristic of the construction according to FIGS. 5, 6 and 10 is that the cylinder with chambers 53 is connected either to upper portion 50 or to cover 55 or to both. Although the cylinder with chambers 53 is freely rotatable both in axial and in rotary sense, its position is at all times defined. To that end:

The cam of hub 56 is provided with run-on lugs and stops

Intermediate ring 112 is mounted for axial sliding movement on shaft 56, so fixed in the direction of rotation The intermediate ring is provided at its top and bottom with run-on lugs and stops and cover 55 likewise has lugs.

Intermediate ring 112 should therefore move axially only around cylinder 53 for about 5 mm in upward direction (after brewing) and for about 5 mm in downward direction (prior to filling, across perforated plate 54).

It is observed that furthermore a great many modifications or additions are possible.

For instance, prior to removing the finished, wet product, this can be first blown dry, so that a dry residue is obtained that can be processed more easily than a wet residue.

This blow dry step can take place in two different manners:

First after extraction, heated or non-heated air can be supplied through the drain by producing a subatmospheric pressure above the coffee bed, e.g. by enlarging the space above the coffee bed: by subsequently reducing the space, the then moistened air can be expelled together with the residual liquid present.

Second instead of suction via the drain, as described under 1, the supply of air can also take place via a separate air supply arranged above the bed, which air, after passing the coffee bed, exits the apparatus via said drain.

The disclosed method offers the additional advantage to effect the extraction in all positions.

This method also offers the possibility to effect extraction in one, two or three chambers simultaneously.

Another possibility offered by the method, in the event that three filling chambers are used, is to start a new preparation cycle every 120°, which implies that per each cycle, so at a rotation through 360°, three extractions are possible.

It is finally observed that there has only been a question above of a piston, meaning in general a movable piston. However, it is clear that also a reversal of the movement is possible, so that the piston can be stationary while the filling chamber is moving.

What we claim is:

1. Apparatus for making a batch of beverage such as coffee by liquid extraction from a charge of starting product such as ground coffee, comprising:

a shaft;

a housing having a part which is mounted for rotation about said shaft;

said housing part containing at least two chambers of mutually differing volumetric capacity;

each chamber being defined by an end wall and a peripheral sidewall having a circumferential edge at an end opposite to that where said end wall is located; means defining an axial opening through said end wall;

a respective piston axially slidably disposed in each said chamber and connected with a respective supply tube which penetrates the respective said end wall through the respective said axial opening; each said supply tube having an internal longitudinal bore; means defining an opening through each piston for communicating the respective said chamber, beyond the respective said piston, with the respective said supply tube bore;

a liquid supply system arranged for selective connection with each said supply tube bore for forcibly supplying a charge of liquid to the respective chamber;

a respective removable cover for each chamber, which can be closed against the respective said circumferential edge for choosing the respective chamber;

means defining a respective outlet opening from each chamber on an axially opposite side of the respective said piston from the respective said supply tube, each said outlet opening being arranged to be selectively opened during a time when the respective said chamber is closed by the respective said cover;

means for closing and opening each said chamber using the respective said cover, depending upon angular positioning of said housing part about said shaft;

means for thrusting and retracting each said piston relative to the respective said chamber, depending upon angular positioning of said housing part about said shaft;

whereby, for making a batch of beverage, said housing part may be rotated so as to bring a respective said chamber of selected volumetric capacity to a charging station, at which that chamber, with the respective said cover removed, is filled with a charge of starting product, whereupon the respective cover is closed and extraction liquid introduced through the respective supply inlet bore into contact with the starting product, a resulting batch of beverage drained from the respective chamber through the respective outlet opening, and said housing part rotated to bring the respective said chamber to a discharging station, at which that chamber, with the respective said cover again removed is emptied of its charge of now-spent starting product, at least in part by being pushed out by the respective said piston.

2. An apparatus as claimed in claim 1, characterized by a housing with a horizontal central shaft through which a fluid passage extends wherein the passage of the tubular connection terminates, which housing is partly enclosed by a cap containing a guide groove for operating the cover movement, and the filling of the filling chamber with a starting product can take place in the highest position of the respective filling chamber, and the starting product can then be enclosed by the outward movement of the distributor plate being under the control of a cam roller, while the brewing can take place in the next position of the central shaft, after which the finished starting product can be expelled in a subsequent position.

3. An apparatus as claimed in claim 2, characterized in that the exterior of the cover is controlled by a guide groove disposed in the cap (FIG. 3) provided outwardly of the housing and partly roofing it.

4. An apparatus as claimed in claim 2, characterized in that the cover (12) is connected rotatably through two connecting plates (34, 35) to a connecting piece (11) guided through said guide groove (9) by means of a follower roller (10).

5. An apparatus as claimed in claim 4, characterized in that the second connecting plate (35) is triangular and coacts in the end position with a guide groove and abuts on a stop (115) in such a manner that the connecting plate can effect a tilting movement and hence the cover can perform a linear movement.

6. An apparatus as claimed in claim 2, characterized in that for the axial relative movement of the intermediate part (86) and the part or cover (89), use is made of an outer ring (101) having internal curved slots (103) adapted to coact with lugs (102) on the periphery of the cover.

7. An apparatus as claimed in claim 2, characterized in that for the axial relative movement of the upper part (50), the intermediate part [the cylinder with chambers (53)]and cover (55), use is made of an intermediate ring (112) arranged between the intermediate part with the chambers and the cover and the facing sides of the boss and the intermediate part, and the intermediate part and the intermediate ring, respectively, and the intermediate ring and the cover, respectively, are provided with profiled coacting faces and lugs.

8. An apparatus as claimed in claim 7, characterized in that the cylinder with chambers (53) is connected either to upper part (50), or to cover (55) or to both.

9. An apparatus as claimed in claim 7, characterized in that the boss (56) has run-on lugs and stops and the intermediate ring is mounted for axial sliding movement on the boss.

10. An apparatus as claimed in claim 1, characterized by an intermediate part accommodated in the stationary housing and a cover having a vertical central shaft, there being provided a drive motor whose movement ensures the peripheral positioning of the stationary and the movable part, and a drive motor for axially positioning the movable parts relatively to each other, while the filling of the filling chamber with starting product can take place in a first position, the supply and discharge of liquid in a second position and the removal of the starting product used in a third position, after which the parts, upon further movement, return to their starting position.

11. An apparatus as claimed in claim 10, characterized in that an upper part (50) is mounted on a support plate (52), the upper part (50) being affixed to a lower part (51), which parts together form a housing through which extends a central shaft adapted to coact through a screw connection with a boss (56) supporting the cover (55) and this can therefore move vertically for closing the cylindrical chambers in the intermediate part and vertically moving the cover together with the intermediate part for positioning it against the upper part.

12. An apparatus as claimed in claim 11, characterized by a drive motor (63) for driving the boss (56) for bringing the cover and/or the intermediate part with the cylindrical chambers (53) in the correct rotary position.

13. An apparatus as claimed in claim 11, characterized by a motor for moving the intermediate part with cylindrical chambers (53, 86) upwards or downwards relatively to the coacting stationary part of upper part (50, 81), thus enabling confinement of the starting product present in the cylindrical chambers, or removal of the finished starting product.

14. An apparatus as claimed in claim 13, characterized in that the motor (59) directly drives boss (56), thereby moving the intermediate part and cover upwards or downwards.

15. An apparatus as claimed in claim 13, characterized in that the motor (96) engages the teeth (83) of cylinder (82), thereby moving intermediate part (86) upwards or downwards.

16. An apparatus as claimed in claim 10, characterized in that a block (81) constructed as an upper part is attached to a housing (80), the block is provided outwardly with a cylinder (82) connected rotatably thereto, said cylinder being externally provided with teeth (83) and internally with a screw thread (84) adapted to coact with a corresponding screw thread (85) of a cylinder (86) inwardly of which there are provided a plurality of filling chambers (88) shut off at the undersides by a cover (89) having a beverage drain (92).

17. An apparatus as claimed in claim 10, characterized in that the apparatus is constructed as a unit which is demountable relatively to the support plate and the drive(s).

18. An apparatus as claimed in claim 1, further characterized by means for displacing a quantity of air through the coffee bed after extraction.

19. An apparatus as claimed in claim 18, characterized by means for producing successively a subatmospheric and a superatmospheric pressure above the coffee bed.

20. An apparatus as claimed in claim 18, characterized by an air supply duct provided above the bed in the chamber.

* * * * *